US012007213B2

(12) United States Patent
Hemsen et al.

(10) Patent No.: US 12,007,213 B2
(45) Date of Patent: *Jun. 11, 2024

(54) DISPENSE FOR APPLYING AN ADHESIVE TO REMOTE SURFACE

(71) Applicant: Henkel IP & Holding GmbH, Duesseldorf (DE)

(72) Inventors: Steven J. Hemsen, Southington, CT (US); Bryan DesRoches, Wethersfield, CT (US); Edward A. Y. Fisher, Newington, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,553

(22) Filed: Jun. 30, 2020

(65) Prior Publication Data

US 2020/0333120 A1 Oct. 22, 2020

Related U.S. Application Data

(62) Division of application No. 16/450,255, filed on Jun. 24, 2019, now Pat. No. 10,724,838, which is a division of application No. 13/963,716, filed on Aug. 9, 2013, now Pat. No. 10,422,614.

(60) Provisional application No. 61/701,139, filed on Sep. 14, 2012.

(51) Int. Cl.

| | |
|---|---|
| ***F42B 5/067*** | (2006.01) |
| ***B05D 5/10*** | (2006.01) |
| ***F42B 5/073*** | (2006.01) |
| ***F42B 33/00*** | (2006.01) |
| *F42B 33/14* | (2006.01) |
| *B05C 5/02* | (2006.01) |
| *B05C 11/10* | (2006.01) |

(52) U.S. Cl.

CPC .............. *F42B 33/001* (2013.01); *B05D 5/10* (2013.01); *F42B 5/067* (2013.01); *F42B 5/073* (2013.01); *F42B 33/14* (2013.01); *B05C 5/0212* (2013.01); *B05C 11/1034* (2013.01)

(58) Field of Classification Search

CPC ..... B05D 5/10; B05C 5/0212; B05C 11/1034; F42B 33/001; F42B 5/073; F42B 33/14; F42B 5/067

See application file for complete search history.

(56) References Cited

U.S. PATENT DOCUMENTS 1,400,034 A 12/1921 Dilley
1,566,591 A 12/1925 Goldsmith (Continued)

OTHER PUBLICATIONS

Conduit Definition of Conduit by Merriam-Webster.

*Primary Examiner* — Jonathan C Weber
(74) *Attorney, Agent, or Firm* — Steven C. Bauman

(57) ABSTRACT

A dispense for dispensing an adhesive onto a remote surface, such as a case mouth and primer ammunition. The dispense includes a reservoir containing an adhesive; a positive displacement pump; and a nozzle having a tapered tip. The positive displacement pump delivers a predetermined amount of the adhesive, preferably an anaerobic adhesive, from the reservoir to the nozzle at predetermined intervals. The nozzle discharges the predetermined amount of adhesive through the air and at least 1/16-inch onto the remote surface.

19 Claims, 2 Drawing Sheets

(56) References Cited

U.S. PATENT DOCUMENTS 1,871,291 A * 8/1932 Adams ...................... F16N 5/00 222/333
2,731,173 A 1/1956 William
3,118,610 A * 1/1964 Techler ............... B05B 12/1409 239/304
3,323,681 A 6/1967 Di Vette
3,543,968 A * 12/1970 Baker ................... B05C 17/002 222/146.1
4,084,729 A 4/1978 Epple
4,166,579 A * 9/1979 Beise ........................ B05B 9/01 239/526
4,176,793 A * 12/1979 Heinrich ................. B05B 12/00 222/144.5
4,245,759 A * 1/1981 Baker ............... B05C 17/00523 219/230
4,564,410 A * 1/1986 Clitheros .............. B05C 5/0216 156/356
4,699,575 A * 10/1987 Geisel ..................... F04C 2/086 277/365
4,773,566 A * 9/1988 Hoagland ............. B05C 17/002 222/146.5
4,787,332 A * 11/1988 Geisel .................. F16J 15/3208 118/692
4,858,172 A * 8/1989 Stern .................... G05D 7/0676 700/40
5,000,351 A * 3/1991 Rudick ................ B67D 1/0036 222/105
5,256,203 A * 10/1993 Moore .................. B05C 5/0212 118/302
5,263,608 A * 11/1993 Kiernan ................... A24C 5/24 118/688
5,303,141 A * 4/1994 Batchelder ............ B29C 64/118 700/29
5,505,777 A * 4/1996 Ciardella ............. B23K 3/0607 118/663
5,525,515 A * 6/1996 Blattner ................ B01L 3/0241 134/21
5,558,504 A * 9/1996 Stridsberg ............ H05K 3/3485 417/322
5,599,394 A 2/1997 Yabe
5,720,820 A * 2/1998 Boger ................... B05B 7/0861 118/315
5,803,313 A * 9/1998 Flatt ...................... B05B 1/3046 222/146.5
6,206,963 B1 * 3/2001 Abrahams ............. B05C 5/0245 118/300
6,223,950 B1 * 5/2001 Lasko ................. B05C 17/0053 219/426
6,375,094 B1 * 4/2002 Schroeder ............... B05B 5/032 239/113
6,401,002 B1 * 6/2002 Jang ....................... B33Y 30/00 700/119
6,415,958 B1 * 7/2002 Donley ................... B05B 12/00 222/146.5
6,431,468 B1 * 8/2002 Brown .................. B05B 7/1209 239/526
6,460,464 B1 * 10/2002 Attarwala ................. F42B 5/36 102/469
6,561,607 B1 * 5/2003 Lubinsky ............... B41J 25/308 347/8
6,713,021 B1 * 3/2004 Shvets .................. B01L 3/0265 137/487.5
6,932,870 B2 * 8/2005 Gunn ...................... B05C 5/027 118/300
D545,943 S * 7/2007 Rodgers ....................... D23/226
7,396,512 B2 * 7/2008 DiTrolio ................. B01L 3/021 422/522
7,785,673 B2 * 8/2010 Lasko ................. B05C 11/1042 427/591
8,029,744 B2 * 10/2011 Noda .................... B01L 3/0241 422/504
8,087,429 B2 * 1/2012 Cedrone ................... F04B 9/02 137/884
8,210,450 B2 * 7/2012 Zeinstra .................. B05B 15/68 239/288.3
8,225,964 B2 * 7/2012 Clark .................... B05C 17/002 222/153.14
8,292,598 B2 * 10/2012 Laverdiere .............. F04B 43/02 417/274
8,708,253 B2 * 4/2014 Hilfiker ................. B05B 12/002 239/525
9,085,002 B2 * 7/2015 Zimmerman ............. B05B 7/12
9,296,010 B2 * 3/2016 Watanabe ........... B05C 11/1021
9,314,812 B2 * 4/2016 Clark ...................... B05C 11/10
10,190,857 B2 * 1/2019 Burrow ..................... F42B 5/16
10,365,074 B2 * 7/2019 Burrow ................. F42C 19/083
2004/0265185 A1 * 12/2004 Kitagawa .............. B01L 3/0268 422/400
2005/0056183 A1 * 3/2005 Meshirer ................. F42B 35/00 102/439
2007/0006904 A1 * 1/2007 Hagiwara ......... H01L 21/67051 134/198
2007/0049920 A1 * 3/2007 McClurken ........ A61B 18/1445 606/34
2007/0145164 A1 * 6/2007 Ahmadi ................ B05C 5/0275 239/583
2008/0302833 A1 12/2008 Thibodeau
2009/0065532 A1 3/2009 Lafond
2009/0101669 A1 4/2009 Hassler, Jr.
2009/0157075 A1 * 6/2009 Wham ............... A61B 18/1206 606/40
2009/0283551 A1 11/2009 Eschenburg
2010/0279127 A1 * 11/2010 Ukai ..................... B05C 5/0254 428/457
2011/0315232 A1 * 12/2011 Crowell ................. G05D 16/20 137/14
2012/0296325 A1 * 11/2012 Takashino .......... A61B 18/1442 606/27
2012/0330310 A1 * 12/2012 Takashino ......... A61M 5/14212 606/45
2013/0006227 A1 * 1/2013 Takashino .......... A61B 18/1445 606/13
2014/0209630 A1 * 7/2014 O'Leary ........... B05C 17/00566 222/23
2016/0153602 A1 * 6/2016 Ahuja ............... F16L 55/02754 138/44
2016/0175878 A1 6/2016 Belanger
2016/0179107 A1 * 6/2016 Pemberton ............ F16K 31/602 222/173

* cited by examiner

DISPENSE FOR APPLYING AN ADHESIVE TO REMOTE SURFACE

FIELD OF THE INVENTION

The present invention is a dispense for applying an adhesive material to a remote surface. In particular, the present invention relates to a dispense for applying adhesive material to a case mouth and primer of an ammunition round that projects the adhesive through the air.

BACKGROUND OF INVENTION

Dispensing adhesives onto surfaces without contacting the surface with the tip of the dispense nozzle is difficult because of the characteristics of the adhesives, in particular the low viscosity and the tendency for the adhesive to cure on/in the tip of the nozzle. One application where the application of an adhesive to a surface has been difficult is the case mouth of an ammunition round. Various methods and apparatus have been developed for applying sealant materials to the inside of the case mouth of cartridge cases. The sealant is used to help prevent moisture from getting inside the cartridge case and improves the performance of the bullet in outdoor environments, while also increasing the storage life. The types of sealant material used and the manner in which they are applied affect how the bullet is secured to the cartridge case. The bullet must be securely held in the case mouth of the cartridge case so that it does not fall out during manufacture or when being used and the seal must isolate the interior of the cartridge case from the exterior environment. Preferred sealants provide effective sealing properties and provide sufficient, but not excessive, adhesion between the bullet and the case mouth of the cartridge case.

In the past, the case mouths of cartridge cases have been sealed to prevent moisture infiltration around the bullet by applying a sealant to the inside of the case mouth before beginning other loading operations. Traditionally, the preferred sealant was a black asphaltic tar. It was applied wet and set aside for drying and curing. Once the sealant dried, the frictional heat from seating the bullet partially re-melted the tar, ensuring a good seal. However, this method was time consuming, did not allow high throughputs, and after application the sealant has a short work life, meaning projectiles had to be assembled with a pre-set time or they would not seal.

There is no proven method in the prior art for applying an anaerobic adhesive to an ammunition case mouth and primer. Various attempts have been made to use touch transfer dispensing methods to apply the sealant to the case mouth. However, touch transfer has not been found to be an optimal method for several reasons. First, when dispensing on the primer, the dispense must be carried out with the bullet in a horizontal position. This requires a mechanism that slides in and out as the bullet passes by on a conveyor and greatly reduces throughput potential. Second, anaerobic adhesives begin to cure when they contact metal. Thus, anaerobic adhesives used with a touch transfer method begin to cure when the dispense tip contacts the active metals (i.e., brass and copper) of the bullet. This reduces throughput and current touch transfer methods typically produce no more than 200 rounds per minute. Accordingly, there is a need for a dispense system with increased throughput, wherein the adhesive does not contact the bullet when the adhesive is in the dispenser.

SUMMARY OF THE INVENTION

In accordance with the present invention, a dispense for dispensing an adhesive onto a remote surface is provided. The dispense includes a reservoir containing an adhesive; a positive displacement pump; and a nozzle having a tapered tip. The positive displacement pump delivers a predetermined amount of the adhesive, preferably an anaerobic adhesive, from the reservoir to the nozzle at predetermined intervals. The nozzle can have at least a 27 gauge discharge port for discharging the predetermined amount of adhesive through the air and onto the case mouth and primer ammunition. Preferably, the distance between the discharge port of the nozzle and the surface is at least 1/16-inch. The positive displacement pump is preferably a rotary pump and operates at a speed of from 1,400 to 1,500 rpm.

BRIEF DESCRIPTION OF THE FIGURES

The preferred embodiments of the dispense of the present invention, as well as other objects, features and advantages of this invention, will be apparent from the accompanying drawings wherein.

DETAILED DESCRIPTION OF THE INVENTION

Figure 1:
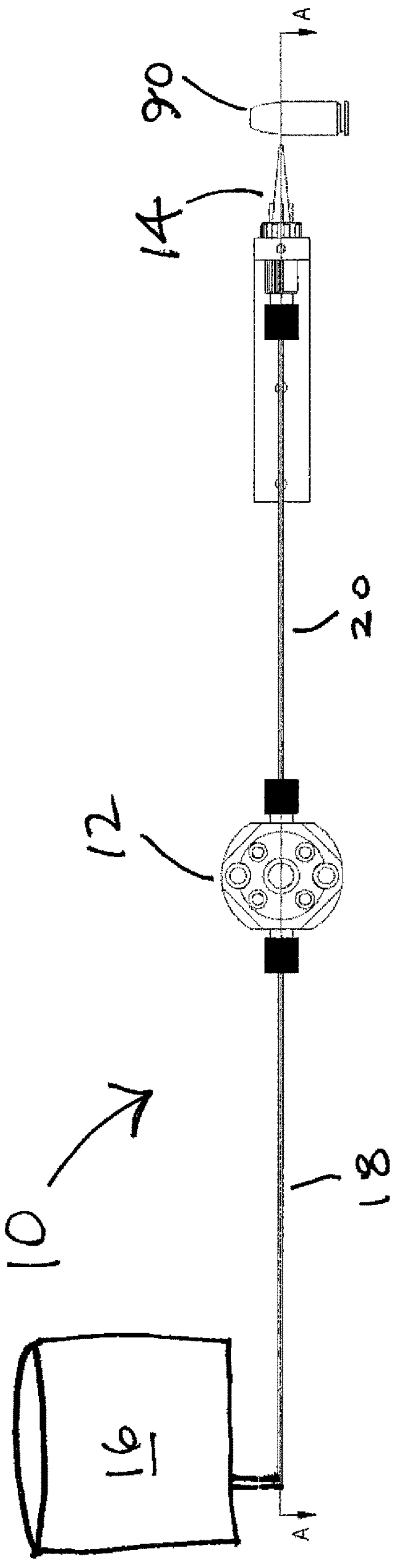
FIG. 1 is a side view of the dispense being used to seal a case mouth and primer ammunition round.

The present invention is a dispense (also interchangeably referred to herein as “the dispense” or “the dispense system”) used for dispensing of adhesives, preferably light curing anaerobic adhesives having viscosities of 30-45 cps, onto remote surfaces. As used herein, the term “remote surfaces” refers to any surface not in contact with the dispense that can be bonded to another surface by an adhesive, wherein the surface can include metal, plastic, wood and synthetic and composite materials. The dispense system preferably dispenses an anaerobic sealant or adhesive (e.g., Loctite® 190700 CMS) onto a remote surface. In preferred embodiments, the anaerobic sealant is dispensed onto the surface of a case mouth and primer ammunition round. Anaerobic adhesives begin to cure when they come in contact with a metal and the absence of air. The dispense “shoots” adhesive approximately 1/16" from the discharge port in the nozzle tip to the remote surface without the nozzle tip contacting the remote surface, preferably the case mouth and the primer of the bullet. This dispense uses a rapid fire through the air technique that overcomes the problems encountered by touch transfer dispenses, wherein the tip contacts the surface. By “shooting” the adhesive through the air, the dispense system eliminate the potential to contaminate the dispense tip by eliminating contact of the tip with active metals on the surface.

The dispense system includes an adhesive, a first conduit for supplying the adhesive to a pump and a second conduit connecting the pump discharge to a nozzle through which the adhesive is dispensed. The adhesive can be stored in a reservoir or a cartridge and delivered to the pump using well known methods, such as pressurizing the reservoir/cartridge to force the adhesive to flow to the pump or using a plunger/rod assembly to push the adhesive out of the reservoir/cartridge. The pump delivers a predetermined amount of adhesive to the nozzle with sufficient pressure so that, when the adhesive exits the nozzle, it travels through the air and onto the bullet. The nozzle preferably has a tapered needle tip that provides back pressure and helps to direct the adhesive. The discharge port of the tapered needle tip has a diameter of 25 gauge or larger, preferably about 27 gauge. The tapered tip needle has been found to provide more accurate and reliable dispensing.

The pump is preferably a positive displacement pump that can be adjusted to discharge specific volumes of adhesive according to the user's application. Positive displacement pumps are well known to those skilled in the art and they deliver a definite volume of liquid for each cycle of pump operation. This volume is constant regardless of the resistance to flow offered by downstream components in the system up to the rated capacity of the pump. A positive displacement pump cyclically delivers liquid in separate volumes with no delivery in between. This allows the cycles to correspond to the bullets that are sequentially placed in front of the nozzle. As the pump shaft rotates, a notched portion of the pump head displaces the fluid from one side of the pump to the other. This motion is what shoots the adhesive through the air and onto the bullet.

The positive displacement pump operates at speeds of from 0 to 1,500 rpm, preferably 1,200-1,500 rpm and most preferably between 1,400 and 1,500 rpm. The most preferred positive displacement pumps for the dispense system are rotary positive displacement pumps. The dispense system of the present invention can increase throughput from about 200 rounds per minute for prior art methods to about 400 rounds per minute using a single dispense.

The dispense system deposits an anaerobic adhesive onto a bullet without the dispense tip contacting the remote surface. This eliminates the problems in the touch transfer method caused when the adhesive began to cure upon contacting a metal surface, such as the surface of an ammunition round. Instead, the dispense tip is positioned a distance from the surface and shoots adhesive through the air (about 1/16" or more) from the tip to the bullet case mouth and primer. This eliminates the need for a mechanism that slides in and out and provides increased throughput potential. When dispensed onto an ammunition round, the anaerobic adhesive travels through the air and contacts either the case mouth or primer and wicks around the surfaces. Because the tip of the dispense nozzle does not contact the bullet, the adhesive does not begin to cure and clog the dispense tip due to contact with active metals. This allows the dispense system to operate at high speeds of up to 400 parts per minute.

Figure 2:
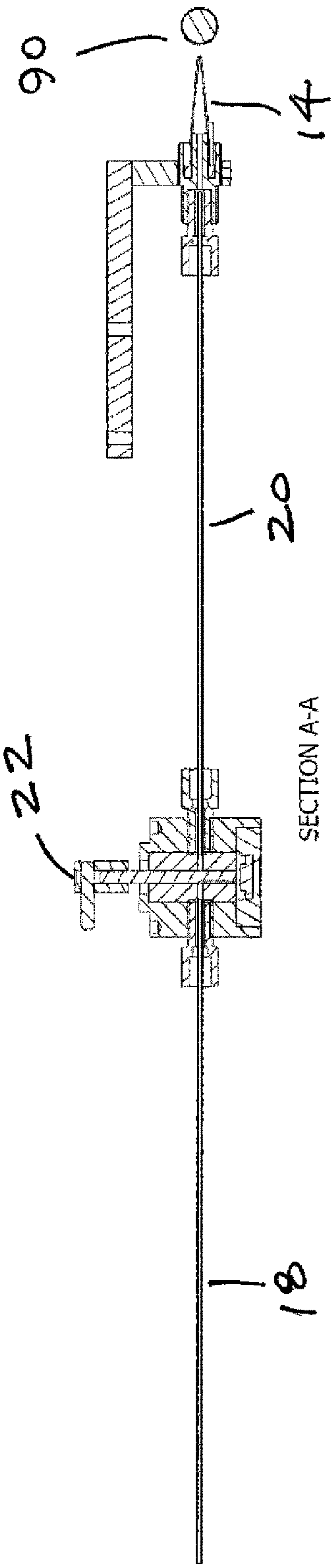
FIG. 2 is a sectional view A-A of the dispense shown in FIG. 1.
Figure 3:
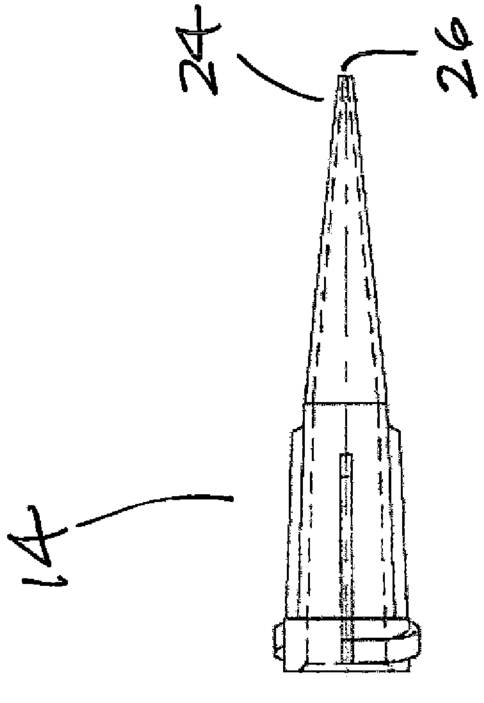
FIG. 3 is a side view of a preferred nozzle for discharging the adhesive with a tapered tip needle, which is used with the dispense shown in FIG. 1.

Referring now to the figures, FIG. 1 shows a side view of the dispense system 10, which includes a positive displacement pump 12, a nozzle 14, a pressurized reservoir containing the adhesive 16, and connecting tubing 18, 20. The adhesive flows from the reservoir 16 under pressure to the rotary pump 12, which delivers the adhesive to the nozzle 14 at predetermined intervals in predetermined amounts. The adhesive is discharged from the nozzle 14 through the air and onto a bullet 90. FIG. 2 is a sectional view A-A of the dispense system 10 shown in FIG. 1 and it shows the pump shaft linkage 22 that connects to a motor. FIG. 3 is a side view of a preferred nozzle 14 with a tapered tip needle used with the dispense shown in FIG. 1. The nozzle 14 has a tapered tip 24 with a discharge port 26, which provides a back pressure and improves the accuracy of the adhesive deposited on the bullet 90.

EXAMPLES

The examples set forth below serve to provide further appreciation of the invention but are not meant in any way to restrict the scope of the invention.

Example 1

An ammunition customer would like to dispense anaerobic onto ammunition case mouth and primer at a rate of 400 bullets per minute with few dispensing points as possible. Touch transfer simply is not fast enough. The dispense system is used to dispense adhesive through the air (i.e., "shooting") onto the bullet, which allows the customer to gain the required process speed. The dispenser is capable of dispensing at a rate of 400 bullets per minute using 1 dispense point.

Example 2

A customer wishes to positively dispense anaerobic adhesive onto the case mouth or primer of a round. Current methods for dispensing onto ammo rounds are based on pressure timed system dispense, which is rate limiting and accuracy limiting. The dispense system uses a positive displacement pump to dispense a predetermined amount of adhesive onto the case mouth and satisfy the customers requirements.

Example 3

The dispense system eliminates touch transfer from the dispense method and reduces the potential for the dispense tip to clog/cure over time as the adhesive contacts the metal of the bullet.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A method for dispensing an adhesive onto a surface, steps of which comprise:

providing a reservoir containing an adhesive;

providing a pump to deliver a predetermined amount of adhesive dispensed from the reservoir at predetermined intervals;

providing a nozzle having a tapered tip to receive the adhesive and discharge the adhesive onto the surface;

providing a first conduit for directly connecting the reservoir and the pump such that the adhesive is supplied directly from the reservoir to the pump; and providing a second conduit for directly connecting the pump and the nozzle such that the adhesive is supplied directly from the pump to the nozzle; and discharging the adhesive from the tapered tip of the nozzle through the air onto the surface in a non-touch transfer manner;

wherein the number of predetermined intervals is greater than 200 per minute;

wherein the adhesive in the reservoir is an anaerobic adhesive; and wherein the surface is a case mouth and primer ammunition round.

2. The method according to claim 1, wherein the adhesive in the reservoir is light curable.

3. The method according to claim 1, wherein the adhesive has a viscosity of 30-45 cps.

4. The method according to claim 1, wherein the tapered tip is 1/16" or more from the surface while the adhesive is being discharged.

5. The method according to claim 1, wherein the nozzle having a tapered tip is configured to receive the adhesive and discharge the adhesive onto the surface without the tapered tip of the nozzle contacting the surface.

6. The method according to claim 1, wherein the tapered tip of the nozzle has a circular discharge port.

7. The method according to claim 6, wherein the circular discharge port of the tapered tip of the nozzle has a diameter of at least 27 gauge.

8. The method according to claim 1, wherein the number of predetermined intervals is 400 per minute.

9. A method for dispensing an adhesive onto a remote surface, steps of which comprise:
- providing a dispenser comprising:
  - a reservoir containing a liquid adhesive, a pump, and a nozzle having a tapered tip;
- delivering a predetermined amount of the liquid adhesive from the reservoir to the nozzle at predetermined intervals;
- discharging the predetermined amount of adhesive through the air onto the remote surface in a non-touch transfer manner;
- providing a first conduit for directly connecting the reservoir and the pump such that the adhesive is supplied directly from the reservoir to the pump; and
- providing a second conduit for directly connecting the pump and the nozzle such that the adhesive is supplied directly from the pump to the nozzle;
- wherein the number of predetermined intervals is greater than 200 per minute;
- wherein the adhesive in the reservoir is an anaerobic adhesive; and
- wherein the remote surface is a case mouth and primer ammunition round.

10. The method according to claim 9, wherein the adhesive has a viscosity of 30-45 cps.

11. The method according to claim 9, wherein the tapered tip is 1/16" or more from the remote surface while the adhesive is being discharged.

12. The method according to claim 9, wherein the discharging of the predetermined amount of adhesive through the air onto the remote surface is performed without the tapered tip of the nozzle contacting the remote surface.

13. The method according to claim 9, wherein the tapered tip of the nozzle has a circular discharge port.

14. The method according to claim 13, wherein the circular discharge port of the tapered tip of the nozzle has a diameter of at least 27 gauge.

15. A dispenser for dispensing an adhesive onto a surface, the dispenser comprising:
- a reservoir containing a flowable adhesive;
- a pump for supplying a constant volume of said adhesive;
- a nozzle having a tapered tip, the tapered tip having a discharge port, wherein when dispensing the pump delivers a predetermined amount of the flowable adhesive from the reservoir to the nozzle at predetermined intervals, and wherein the nozzle is not in contact with the surface and discharges the predetermined amount of adhesive onto the surface in a non-touch transfer manner;
- a first conduit for directly connecting the reservoir and the pump such that the adhesive is supplied directly from the reservoir to the pump; and
- a second conduit for directly connecting the pump and the nozzle such that the adhesive is supplied directly from the pump to the nozzle;
- wherein the number of predetermined intervals is greater than 200 per minute;
- wherein the adhesive is an anaerobic adhesive;
- wherein the surface is a case mouth and primer ammunition round.

16. The dispenser according to claim 15, wherein the pump is a rotary pump.

17. The dispenser according to claim 15, wherein the discharge port of the tapered tip of the nozzle is a circular discharge port, and wherein the circular discharge port of the tapered tip of the nozzle has a diameter of at least 27 gauge.

18. The dispenser according to claim 15, wherein the pump operates at a speed of from 1,400 to 1,500 rpm.

19. The dispenser according to claim 15, wherein the distance between the discharge port and the surface is at least 1/16-inch.

* * * * *